United States Patent [19]
Keyes et al.

[11] 3,729,177
[45] Apr. 24, 1973

[54] IN-PLACE CLEANING SYSTEM

[75] Inventors: Richard Martin Keyes, Rockford; William Christian Herramann, Rockton, both of Ill.

[73] Assignee: Beatrice Foods Company, Chicago, Ill.

[22] Filed: Feb. 18, 1972

[21] Appl. No.: 227,360

[52] U.S. Cl. .................... 259/10, 134/132, 134/166
[51] Int. Cl. .............................................. B01f 7/08
[58] Field of Search ................ 259/9, 10, 109, 110, 259/25, 26, 45, 46; 134/132, 152, 166

[56] References Cited

UNITED STATES PATENTS

| | | |
|---|---|---|
| 2,587,127 | 2/1952 | Erickson ........................ 259/10 |
| 2,898,092 | 8/1959 | Miller ........................... 259/10 |
| 3,222,035 | 12/1966 | Lutz ............................ 259/110 |
| 3,498,839 | 3/1970 | Methta .......................... 134/132 |

*Primary Examiner*—Robert W. Jenkins
*Attorney*—James M. Wetzel et al.

[57] ABSTRACT

An in-place cleaning and sanitizing system for a frozen confection machine. A wash head is extended over the storage hopper of the machine and liquid and a cleansing agent are introduced into the wash head. A cleaning solution is dispensed from the wash head into the storage hopper, and then into the freeze chamber of the machine, where it cleans and sanitizes the hopper, freeze chamber and all surfaces coming into contact with the frozen confection material.

7 Claims, 3 Drawing Figures

Patented April 24, 1973 3,729,177
2 Sheets-Sheet 2
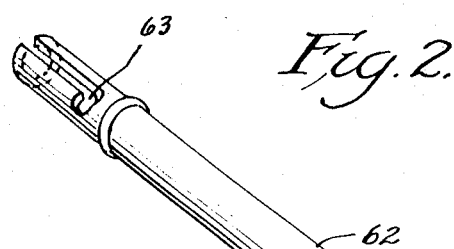
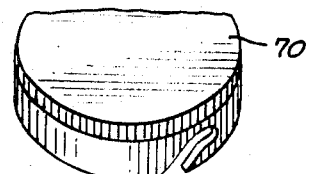
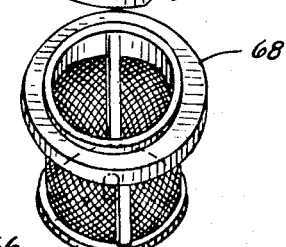
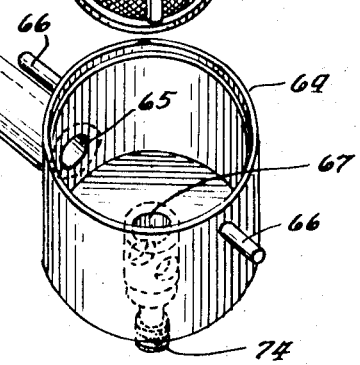
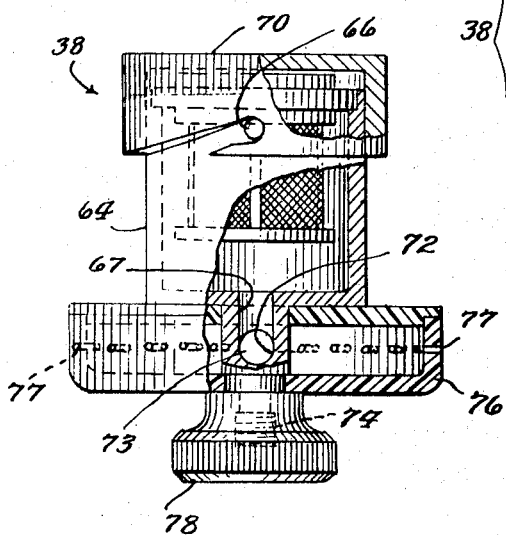
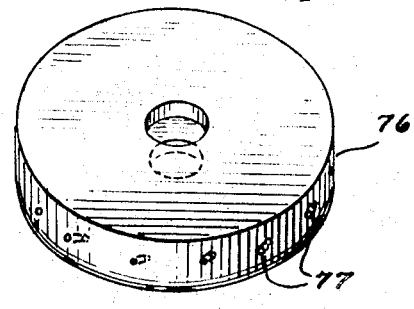
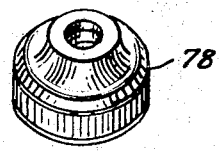
Fig. 2.
Fig. 3.

IN-PLACE CLEANING SYSTEM

The present invention relates to an improvement in frozen confection machines and specifically to systems for cleaning frozen confection machines.

There has been a continuing need for a system which would automatically permit the washing and sanitizing of the machine. In present frozen confection devices, the machine must be partially disassembled each day and cleaned and sanitized primarily by hand. The primary disadvantage of these devices are the time it takes to clean each day, and the possibility that the operator will be in a hurry and neglect to properly clean all parts.

Therefore, it is a primary object of the present invention to provide a cleaning system for an open type frozen confection machine which cleans and sanitizes the machine automatically.

An additional object of the present invention is to provide a cleaning system for a frozen confection machine which provides automatic, in-place cleaning apparatus requiring no installation of additional parts.

Still another object of the present invention is to provide a cleaning system for a frozen confection machine wherein a cleansing agent is automatically dispensed with a cleaning fluid to all surfaces of the machine coming into contact with the confection food material.

A further object of the present invention is to provide a cleaning system for a frozen confection machine having central means which simultaneously activate the machine and the cleaning system.

An additional object of the present invention is to provide a spray head in a cleaning system for a frozen confection machine having means to cause the spray head to rotate as a result of the force of a fluid introduced to said spray head.

Still another object of the present invention is to provide means in a cleaning system for frozen confection machines adapted to mix a liquid and cleansing agent in a freeze chamber of the machine and adequately clean the freeze chamber.

These and other objects and features of this invention will be better understood by reference to the following detailed description of one embodiment thereof, selected for purposes of illustration and shown in the accompanying drawing, in which:

FIG. 2 is an exploded view of a wash head assembly employed in the semi-frozen confection machine of FIG. 1; and FIG. 3 is a front view partially broken away of the wash head assembly in accordance with the invention.

Figure 1:
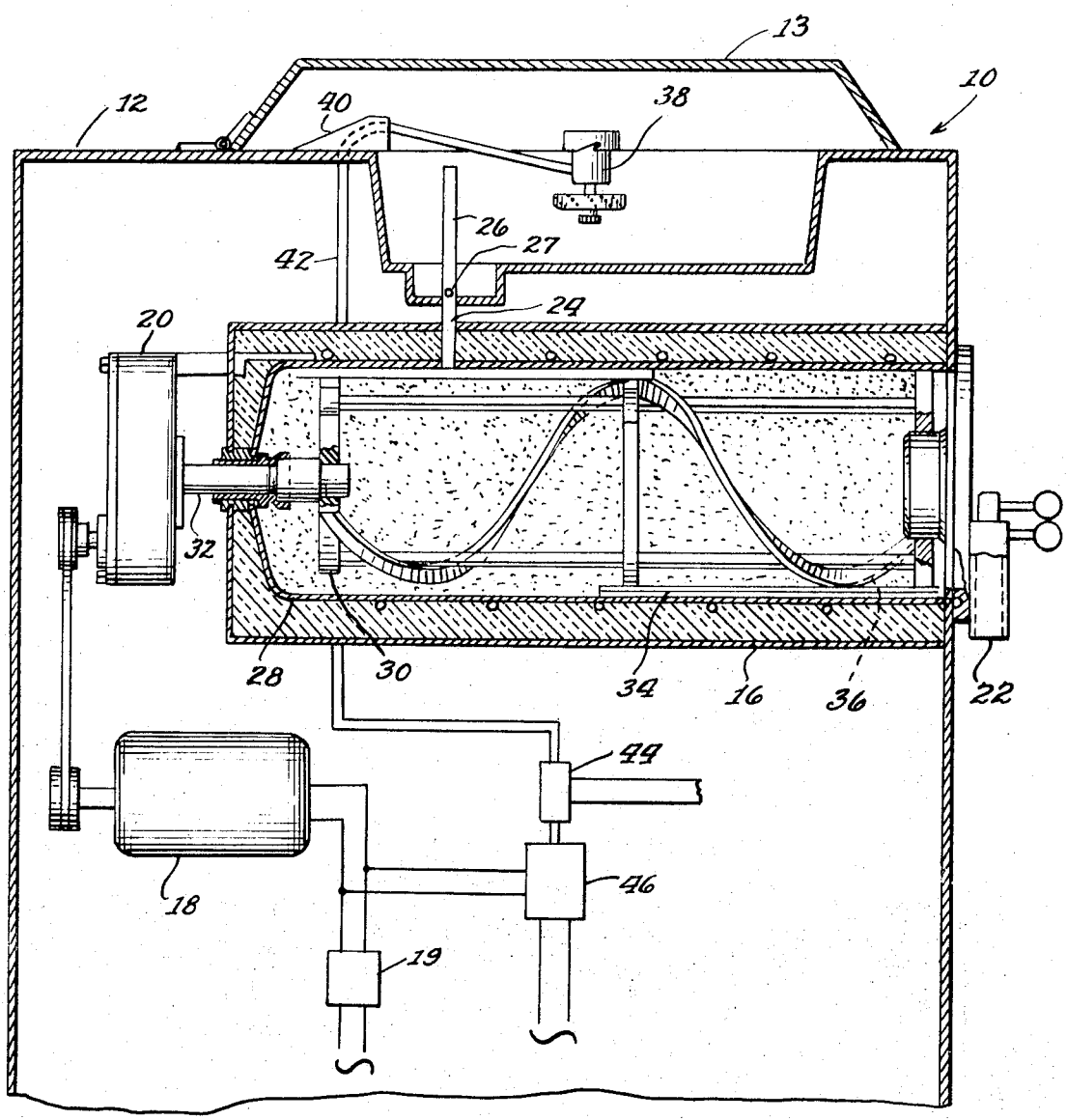
FIG. 1 is a cross sectional elevation view of an exemplary semi-frozen confection machine in accordance with the present invention.

Turning now to the drawings, there is shown in FIG. 1 a semi-frozen confection machine 10 including a cleaning system in accordance with the present invention.

The semi-frozen confection machine includes outer shell 12 supporting a liquid confection storage hopper 14, a freezer unit 16, a drive motor 18, a gear box 20 and an outlet valve 22. The storage hopper 14 is connected by means of a conduit 24 to the freezer unit 16 for purposes of supplying liquid confection material stored in the storage hopper to freezer unit 16. The manner of feed of liquid confection material from the hopper 14 through the conduit 24 may be by gravity feed employing a stand pipe 26 including an orifice 27 at the bottom thereof through which the liquid confection product passes into conduit 24 as illustrated, or it can be by means of a pump which draws the liquid confection material from the storage hopper and feeds it directly into the conduit 24.

The freezer unit 16 includes a freezing cylinder 28 provided with a rotary beater 30 connected to a shaft 32 extending through the rear of the freezer unit 16 to the gear box 20. The rotary beater 30 is provided with a scraper blade 34 and may, but need not be, provided with a helical blade 36 which, when it rotates, tends to encourage the freezing mass of liquid confection from the rear toward the front of the freezing cylinder 28. It is understood but not illustrated that the freezing unit 16 is also provided with refrigeration equipment by means of which the freezing cylinder is cooled.

In use, the liquid confection material entering the freezing cylinder 28 from the storage hopper 14 through the conduit 24 is cooled, agitated, and mixed by the action of the rotary beater 30, the scraper blade 34 and the helical blade 36. The material, as it is cooled, changes in viscosity and is pushed forward toward the end of the cylinder including the outlet valve 22. There, by selectively opening and closing the outlet valve 22, frozen or semi-frozen confection material is exhausted from the freezing cylinder 28. During operation, the drive motor 18 is operated through a control circuit 19 connected to a source of electric power. In order to protect the liquid confection material in the storage hopper 14, the outer shell 12 also carries a hinged hood 13 which serves to cover the storage hopper 14.

The frozen confection machine in accordance with the invention is also provided with a wash head 38 which extends over and into the storage hopper 14. The wash head 38 is extended by means of a connector 40, here shown to be on the periphery of the storage hopper, although the connector may also be a column extending upwardly from the center of the hopper if so desired. The connector in every instance is provided with a conduit 42 extending to a supply of water through valve 44. The valve 44 is operated by means of a control circuit 46 which is also connected to the drive motor 18.

When it is desired to utilize the cleansing equipment, the first step is to drain all of the liquid as well as frozen confection material from the storage hopper 14 and the freezing cylinder 28 by removing the stand pipe 26 and opening the outlet valve 22. If removable, the outlet valve 22 should be washed and sanitized separately with the stand pipe 26. Thereupon the control circuit 46 may be activated to open the valve 44 and permit a flow of water through the conduit 42 to the washer head 38.

The details of the wash head 38 are shown in FIGS. 2 and 3. Specifically, the wash head 38 includes a stem 62 which is connected to a cup 64 through an aperture 65 in its side wall. The cup 64 comprises a chamber therein, and is provided with a pair of cap pins 66 by means of which cap 70 is connected to the cup 64 forming a removable cover for the hollow chamber.

The wash head 38 also includes a porous cup 68 which fits inside cup 64 and is adapted to hold a cleaning agent such as washing powder or sanitizing powder.

Cap 70 fits over cup 64 and is provided with slots in its side to engage the pins 66 in the cup 64. At its lower extremity, cup 64 is also provided with a cylindrical bearing surface 72 which has a hole extending entirely therethrough and which communicates with the bottom of the cup 64 by means of an aperture 67. The cylindrical bearing surface 72 is threaded at its lower extremity 74 and is adapted to receive annular spray means comprising a spray wheel 76 which is held in place on the cylindrical bearing surface by a nut 78.

The spray wheel 76 has sides which define an annular cavity. The annular cavity is provided with a multiplicity of small apertures 77, the majority of which are arranged at an angle normal to the surface of the spray wheel. Thus, in the arrangement illustrated in FIGS. 2 and 3, water driven through the valve 44 to conduit 42 to the connector 40 in arriving at the stem 62 is discharged into the cup 64 through the aperture 65 and is discharged through the aperture 67 to the hole 73 in the cylindrical bearing surface, and from there into the annular cavity defined by the spray wheel 76. The water introduced into the annular cavity of spray wheel 76 is exhausted through the apertures 77 therein, which being at an angle, causes the wheel to rotate in one rotational direction. Thus, when the porous cup 68 is filled with a cleansing powder or sanitizing agent, and placed in the cup 64 with the cap 70 locked into place, introduction of water into the wash head 38 causes the washing or sanitizing solution to be dissolved and ejected through the apertures 77 in the spray wheel 76.

When the spray head 38 is disposed within the liquid confection storage hopper 14 as illustrated in FIG. 1, the washing liquid or sanitizing liquid causes the sides of the storage hopper 14 to be cleansed and the fluid passes from the storage hopper through conduit 24 into the freezing cylinder 28. At this time, and through the operation of the control circuit 46, the drive motor 18 is operative so that the rotary beater 30 within the freezing cylinder 28 is being rotated. This causes the washing or sanitizing fluid to be mixed well within freezing cylinder 28 and causes the freezing cylinder itself to be cleansed. With the outlet valve 22 open, the cleansing, washing or sanitizing solution is exhausted through valve 22 and thrown away.

When the control circuit 46 operates for a period of time sufficient to cause complete cleansing, the control circuit then operates valve 44 to cut off the water to the wash head 38 and to turn off drive motor 18. At that time, the system is cleansed and the remainder of the washing or sanitizing fluid is withdrawn from the freezing cylinder 28 through the open valve 22.

Preferably, of course, the water supply to valve 44 should be hot water at a temperature not less than 180°F. This insures that the hot water introduced into the freezing cylinder 28 can remove and melt any frozen confection material that may be retained within the unit and cause a thorough cleansing of the freezing cylinder.

The cleaning system of the present invention has been designed so that when used for a continuous period, such as three minutes, all of the powder materials placed into porous cup 68 are dissolved, run through the hopper 14 and freezing cylinder 28, and out the outlet valve 22. A sufficient amount of rinse water is then provided to the system to cause a complete rinsing of the system.

If the system is one that is provided with a pressure pump, the frozen confection machine is first cleansed as described above. Thereafter the wash head 38 is reloaded with washing powder or sanitizing powder and connected to the liquid confection storage hopper 14 in a manner so as to draw the cleansing or sanitizing solution out of the hopper just as it would if liquid confection material were contained in the hopper. The solution is then fed through the pump and discharged into freezing cylinder 28. It is clear that the wash head 38 may be permanently mounted on a machine or may be removable. For the latter purpose, a keyed slot 63 may be provided in the stem 62 so that when matched with a companion male piece in the connector 40, the stem can be located and locked in position when it is necessary for the wash head to be used.

The wash head 38 need not be centrally disposed in the liquid confection storage hopper 14 as shown, but may be positioned so as to permit all surfaces of the hopper to be washed by the washing or sanitizing solution emitted from the spray wheel 76. Additionally, the spray wheel 76 need not be in a wheel form but can be in the shape of a rotatable arm, for example, or consist of extendable pipes. It is only necessary that the rotating implement be provided with discharge ports or apertures which will permit the rotary unit to be driven by the discharging fluid, whereby the exhaust from the rotary unit sprays on the surfaces of the storage hopper 14.

Similarly, while a porous cup 68 is provided in the wash head 38 for purposes of receiving the washing or sanitizing solution, it is understood that the washing powder or sanitizing powder could be provided by a cavity located in the connector 40 or in any position in the conduit 42.

Where the connector is a column extending upwardly from the bottom of the hopper, it is clear that wash head construction would have to be modified to permit an inflow of water in from the bottom rather than from the side. However, that adaptation is well within the scope of those having normal skill in the art.

While it is not necessary to provide a cover 13 for the cleansing unit, it is apparent that if the unit is performing as it should, a substantial amount of spray will be introduced into the atmosphere if a cover 13 is not provided.

From the foregoing description, those skilled in the art will appreciate that numerous modifications may be made in this invention without departing from the spirit thereof. It is not intended that the scope of this invention be limited to the specific embodiment illustrated and described. It is intended that the scope of this invention be limited by the appended claims and their equivalents.

I claim:

1. In a semi-frozen confection machine provided with a:

freeze chamber adapted to freeze liquid confection material;

a storage hopper communicating with said freeze chamber and adapted to contain and supply liquid confection material to the freeze chamber;

a rotary beater in the freeze chamber to rotatably stir liquid material therein;

an outlet valve connected to the freeze chamber for discharging liquid material therefrom; and a drive motor for rotating the rotary beater in the freeze chamber;

the improvement of a cleaning system for the machine comprising:

a wash head a connector at the storage hopper adapted to receive said wash head conduit means for supplying liquid to said wash head through said connector a control valve for said conduit operative between an open position and a closed position to control the flow of said liquid to said wash head;

and means for operating the drive motor and operating the control valve to said open position, whereby said wash head and the rotary beaters are activated simultaneously as said liquid is dispensed from said wash head into said hopper and to said freeze chamber.

2. The semi-frozen confection machine of claim 1 wherein said wash head includes:

means for adding a cleaning agent to the liquid flowing through said wash head.

3. The semi-frozen confection machine of claim 2 wherein said means for adding a cleaning agent includes porous container means disposed in a chamber in said wash head and in contact with the liquid flowing through said wash head.

4. The semi-frozen confection machine of claim 3 wherein said porous container means is removably disposed in said wash head, and said wash head includes removable cap means forming part of said chamber whereby said porous container means is adapted to be installed in or removed from said chamber by removing said cap means.

5. The semi-frozen confection machine of claim 2 whereby rotation of said rotary beater mixes said fluid and said cleansing agent in said freeze chamber and causes said freeze chamber to be cleaned.

6. The semi-frozen confection machine of claim 1 wherein said wash head includes:

annular spray means rotatably attached to said wash head;

cavity means internally disposed in said annular spray means, port means in said wash head in communication with said cavity means adapted to transmit said liquid to said cavity from said liquid supply;

aperture means angularly disposed in said annular spray means in communication with said cavity and adapted to permit the flow of liquid from said cavity, whereby the force of liquid being dispensed through said angular apertures causes said annular spray means to rotate.

7. The semi-frozen confection machine of claim 1 wherein said liquid is supplied at a temperature above the melting point of said confection material.

* * * * *